United States Patent [19]

Traut et al.

[11] Patent Number: 4,613,540

[45] Date of Patent: Sep. 23, 1986

[54] WINDOW FOR BROAD BANDWIDTH ELECTROMAGNETIC SIGNAL TRANSMISSION, AND METHOD OF CONSTRUCTION THEREOF

[75] Inventors: G. Robert Traut, Danielson, Conn.; Frank S. Keahey, Jr., Atlanta, Ga.; Dennis J. Kozakoff, Marietta, Ga.; Paul M. Bethea, Tanthonia, Ga.; Joseph D. Hensel, Stone Mountain, Ga.

[73] Assignee: Rogers Corporation, Rogers, Conn.

[21] Appl. No.: 658,749

[22] Filed: Oct. 9, 1984

[51] Int. Cl.[4] .......................... B32B 7/02; B32B 5/16; B05D 3/02

[52] U.S. Cl. ................................ 428/212; 427/385.5; 428/333; 428/421; 428/422

[58] Field of Search ............... 428/422, 421, 212, 333; 427/385.5, 375

[56] References Cited

U.S. PATENT DOCUMENTS 4,364,884 12/1982 Traut .................................. 264/118

4,401,711 8/1983 Silva et al. ...................... 428/422 X

*Primary Examiner*—Thomas J. Herbert

*Attorney, Agent, or Firm*—Fishman & Dionne

[57] ABSTRACT

A window construction and method are presented for electromagnetic signal transmission having broad bandwidth capability plus excellent resistance to ablation, rain erosion and thermal shock. The window is constructed of an odd number of three or more (i.e., 3, 5, 7, etc.) layers of reinforced PTFE material, with the dielectric constant of each layer (other than the core layer which is selected) being equal to the square root of the product of the dielectric constants of the two bordering layers. In a three layer version, the outer layers each have a dielectric constant which is the square root of the dielectric constant of the center layer; or, stated conversely, the center layer has a dielectric constant which is the square of the dielectric constant of each of the outer layers.

23 Claims, 2 Drawing Figures

WINDOW FOR BROAD BANDWIDTH ELECTROMAGNETIC SIGNAL TRANSMISSION, AND METHOD OF CONSTRUCTION THEREOF

BACKGROUND OF THE INVENTION

This invention relates to the field of electromagnetic signal transmission. More particularly, this invention relates to an electromagnetic window and method of construction thereof for broad bandwidth signal transmission for microwave communication and radar.

Current electromagnetic window constructions principally involve monolithic ceramic or plastic materials of constant and uniform dielectric properties. The effective bandwidth of these materials decreases as both dielectric constant of the material increases and as the frequency of signal transmission increases. A need exists for electromagnetic windows capable of broad band frequency transmission. Even more particularly, a need exists for electromagnetic windows capable of broad band frequency transmission having good thermal characteristics and rain erosion characteristics for use in high speed missiles and aircraft. Presently known electromagnetic window systems do not meet these requirements.

It is well known that multilayer radome wall construction offers enhanced bandwidth capability. However, the problem of realizing the combination of required dielectric constant values with required thicknesses for the layers has been difficult with the currently used materials. Furthermore, at the higher frequencies for mm-wave systems where the wavelength of a layer is small the layers must be very thin. The methods for construction and fabrication now in use cannot meet the tolerances needed.

SUMMARY OF THE INVENTION

The above discussed shortcomings of the prior art are overcome or reduced by the electromagnetic window of the present invention. In accordance with the present invention, an electromagnetic window is constructed of a sandwich of at least three layers of fiber reinforced fluoropolymer materials, particularly polytetrafluoroethylene materials (PTFE) which are normally considered to be intractable and unsuitable.

General principles known in the art for a multilayer wall construction call for an odd number of layers. If one considers a single layer electromagnetic window and a plot is made of transmission on the Y-axis versus frequency on the X-axis the plot will show a series of minimums and maximums as tabulated in Table 1 below:

TABLE 1

| Frequency Designation | Number of wave lengths in the wall | Curve position |
|---|---|---|
| F0 | ¼ | minimum |
| F1 | ½ | maximum |
| F2 | ¾ | minimum |
| F3 | 2/2 | maximum |
| F4 | 5/4 | minimum |
| F5 | 3/2 | maximum |
| F6 | 7/4 | minimum |
| F7 | 4/2 | maximum |
| F8 | 9/4 | minimum |
| F9 | 5/2 | maximum |

The wavelength of the electromagnetic signal in the wall is, of course, dependent on both the dielectric constant of the dielectric and the frequency. The relationship is represented by the formula $$L = \frac{C}{F(E_r)} 0.5$$

where

C=speed of light in vacuum
L=wavelength
F=frequency
$E_r$=dielectric constant

If one desires to get broad band performance between F1 and F3 so that an essentially straight line is plotted between F1 and F3 and the minimum at F2 is about the average of transmission of F1 and F3 this can be done by a three layer design of Table 2 as follows:

TABLE 2

| Layer Number | Dielectric Constant | Thickness in Wave Lengths | Comment |
|---|---|---|---|
| 0 | E = 1 | infinite | ambient air |
| 1 | $E_1 = (E_0E_2)^{0.5}$ | ¼ at F2 | outer |
| 2 | $E_2$ given | ½ at F1 | core |
| 3 | $E_1 = (E_0E_2)^{0.5}$ | ¼ at F2 | inner |
| 4 | $E_0 = 1$ | infinite | ambient air |

If a five layer construction is used, the bandwidth can be further broadened to essentially eliminate the minimums at F2 and F4 by the design set forth in Table 3 as a first approximation where the dielectric constant of any two layers is the square root of the two bordering layers. The same principle can be extended to other odd numbers of layers. The design principle is intended for radiation incident normal to the surface of the layered construction. As the angle of incidence diverges from the normal direction the broadbandedness of transmission will be degraded.

TABLE 3

| Layer Number | Dielectric Constant | Thickness in Wave Lengths | Comment |
|---|---|---|---|
| 0 | $E_0 = 1$ | infinite | ambient air |
| 1 | $E_1 = (E_0E_2)^{0.5}$ | ¼ at F4 | |
| 2 | $E_2 = (E_1E_3)^{0.5}$ | ¼ at F2 | |
| 3 | $E_3$ given | ½ at F1 | core |
| 4 | $E_2 = (E_1E_3)^{0.5}$ | ¼ at F2 | |
| 5 | $E_1 = (E_0E_2)^{0.5}$ | ¼ at F4 | |
| 6 | $E_0 = 1$ | infinite | ambient air |

In accordance with the present invention, for a preferred three layer configuration, the fluoropolymer materials for the sandwich construction are selected so that the dielectric constant ($E_c$) of the core material is selected, and the dielectric constant of each outer layer is the square root of the dielectric constant of the core layer. Also, the thickness of the core layer is ½λ (at $F_1$) and the thickness of the outer layer is ¼λ (at $F_2$), where $F_1$ and $F_2$ have the relationship as set forth with respect to Table 2 for a broad band window operating over a frequency range $F_1$–$F_3$.

In accordance with the present invention, fiber reinforced PTFE blocks are formed in a cold molding process to form blocks of the material having a majority of fibers in an orientation where they are generally perpendicular to the direction of molding compression. These blocks are then formed in a sandwich array, with the core or center block having a dielectric constant equal to the square of the dielectric constant of each of the outer layers. The sandwich structure is then taken through a heating or sintering cycle, with force applied perpendicular to the direction of orientation of the fibers. As a result of both the heat cycle and the force, the blocks are molded together to form an integrated unitary structure which constitutes an electromagnetic window comprised of a core of dielectric material having a dielectric constant equal to the square of the dielectric constant of the outer skins of the window. The resulting material has broad band microwave transmission capabilities and also possesses greatly improved thermal characteristics and rain erosion resistance characteristics as compared to previously available electromagnetic windows.

The above discussed and other features and advantages of the present invention will be apparent to and understood by those skilled in the art from the following detailed description and drawings.

BRIEF DESCRIPTION OF THE DRAWINGS

Referring now to the drawings.

DESCRIPTION OF THE PREFERRED EMBODIMENT

For purposes of simplicity of illustration, the present invention will be described in terms of formation of a unitary electromagnetic window body of generally rectangular structure. However, it will be understood that structures of the present invention can be made in other or more elaborate shapes by the method of the present invention. Also, while the present invention will be discussed in terms of fiber reinforced PTFE composite materials, it will be understood that other fluoropolymer materials may also be employed.

Figure 1:
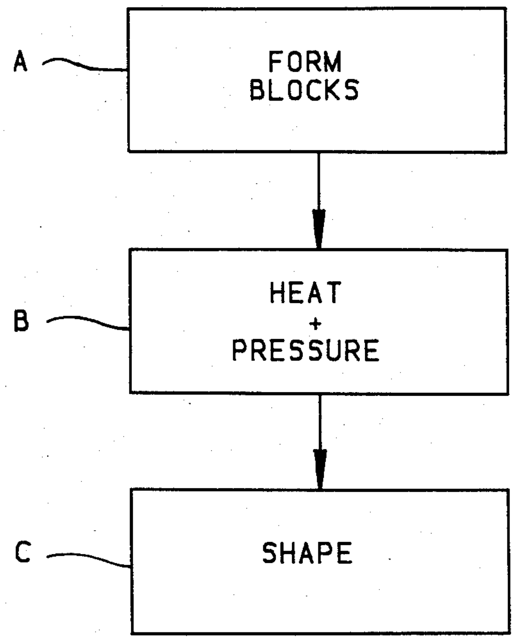
FIG. 1 is a block flow diagram of the process of the present invention.
Figure 2:
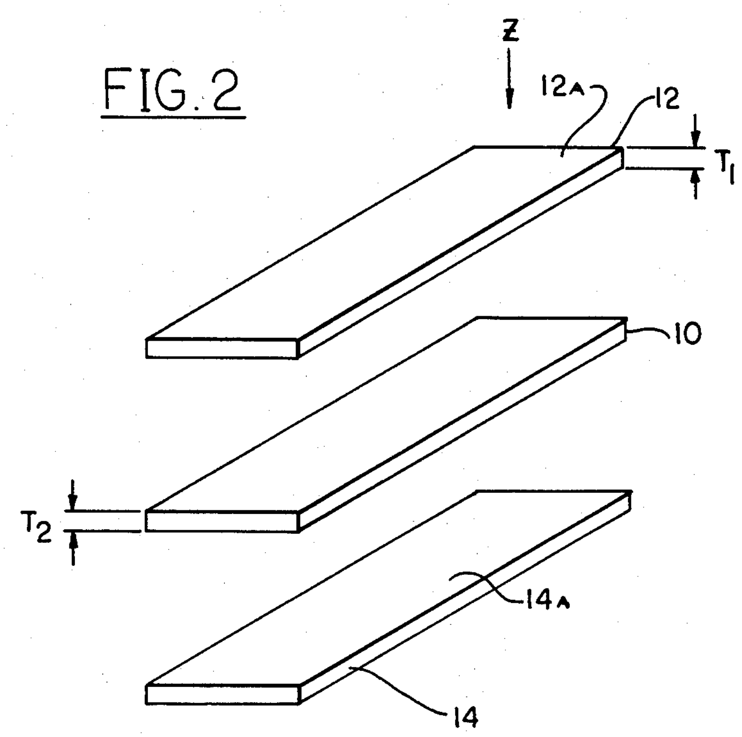
FIG. 2 is an exploded view of a sandwich structure for an electromagnetic window in accordance with the present invention.

The first step in the practice of the present invention comprises the formation of several blocks of material as shown in Step 1 of FIG. 1 and in FIG. 2. The blocks of material are a center or core block 10 and outer or skin blocks 12 and 14, which blocks are to be assembled into a sandwich structure and then formed into a unitary structure. Each of these blocks of material 10, 12 and 14 is formed in accordance with the process for forming the discs as described in U.S. Pat. No. 4,364,884 (which is assigned to the assignee hereof and which is incorporated herein by reference). That is, the blocks are each comprised of PTFE and reinforcing fibers. The reinforcing fibers may be comprised of a ceramic material, microfiber glass or other similar inorganic materials. Thus, by way of example, the fibers may comprise Johns-Manville Type 104 E microfiber glass or "fibrafrax" aluminum silicate fibers available from Carborundum Corporation. The fibers will typically range in diameter of 0.05 to 10 micrometers and will preferably have an aspect ratio of at least 30.

In accordance with the present invention, block 10 is formed of one material, and blocks 12 and 14 are formed from a second material, with the essential feature being that the formed block 10 has a dielectric constant approximately equal to the square of the dielectric constant of either of block 12 or 14. To accomplish this objective, in a preferred configuration of the present invention, block 10 is formed from a composite PTFE/-fiber mixture known as "RT/duroid" Type 5870M made by Rogers Corporation, Rogers, Conn. and comprising approximately by weight:

| | |
|---|---|
| "Teflon" 7A (polytetrafluoroethylene, available from E. I. duPont) | 85% |
| Glass Microfibers (available from the Johns-Manville Corp. and having an average diameter of about 0.2 $\mu m$ and a length exceeding 30 $\mu m$) | 15% |

The final compounded powder, i.e., the PTFE-fiber mixture for blocks 12 and 14, has a prefered bulk density of about 0.25 grams/cubic centimeter. Block 12 is a composite PTFE/fiber material also available from Rogers Corporation, Rogers, Conn. under the designation "RT/duroid" 6006M and comprising by weight:

| | |
|---|---|
| "Teflon" 7A (polytetrafluoroethylene, available from E. I. duPont) | 51% |
| Glass Microfibers (available from the Johns-Manville Corp. and having an average diameter of about 0.2 $\mu m$ and a length exceeding 30 $\mu m$) | 4% |
| Titania (titanium dioxide) filler | 45% |

Other blocks of PTFE material may also be employed, within the general composition of from 95 to 40 parts by weight of PTFE and from 5 to 60 parts by weight of reinforcing fibers and titania, as long as the essential relationship is maintained that the center or core block 10 has a dielectric constant approximately equal to the square (±15%) of the dielectric constant of either of the outer or skin blocks 12, 14; or, stated conversely, the dielectric constant of blocks 12 and 14 is approximately equal to the square root (±15%) of the dielectric constant of block 10).

The powder from which the blocks 10, 12 and 14 are formed is preblended, screened to insure against lumps, is milled and cold molded to form the blocks (in Step A of FIG. 1). The blocks are to be characterized by uniform fiber dispersion and uniform density. In a particularly preferred arrangement to achieve good thermal properties and resistance to erosion, the blocks 12 and 14 are formed by compacting the powder for both of these blocks to form a single billet in a cold molding step with the application of direct linear pressure. This manner of forming the blocks results in a majority of fibers assuming an orientation wherein they are generally perpendicular to the direction of molding compression. The blocks 12 and 14 are then cut from this single billet, with the direction of fiber orientation being generally perpendicular to the face surfaces 12(*a*) and 14(*a*).

The above described method of forming the blocks (which may also be used for forming block 10 as well) is described in U.S. Pat. No. 4,364,884, which is owned by the assignee hereof and is incorporated herein by reference. The blocks may also be formed with fiber orientation as described in application Ser. No. 263,191 (which is owned by the assignee hereof and is incorporated herein by reference).

The formed block 10 has a dielectric constant of approximately 6.00 if made from the RT/duroid 6006M material identified above; and the blocks 12 and 14 will each have a dielectric constant of 2.32 if made from the RT/duroid 5870M material identified above. An essential feature of the present invention as applied to a three layer construction is that the dielectric constant of center or core block 10 be equal to the square of the dielectric constant of the blocks 12 and 14, within a tolerance range of ±15%. The RT/duroid 6006M and 5870M materials identified above meet these requirements, although to optimize or fine tune the structure it may be desirable to adjust downward the dielectric constant of the material of block 10, which downward adjustment can be accomplished by reducing the titania content of the RT/duroid 6006M material (the dielectric constant being directly related to the titania level).

The final structure to be formed from the blocks 10, 12 and 14 is to serve as a window for microwave transmission. The window is to be designed to function over a predetermined design transmission frequency range of $F_1$ to $F_3$ (where $F_3=2F_1$, and $F_2$ is the mid point between $F_1$ and $F_3$, i.e., $F_2=F_1+\frac{1}{2}(F_3-F_1)$; or, stated another way, $F_1=\frac{2}{3}F_2$ or $F_1=F_2-\frac{1}{3}F_2$ and $F_3=1$ and $\frac{1}{3}F_2$, or $F_3=F_2+\frac{1}{3}F_2$). Each of the blocks 12 and 14 are formed of a thickness $t_1$ equal to $\frac{1}{4}\lambda$ (at $F_2$); while block 10 will have the thickness $t_2$ equal to $\frac{1}{2}\lambda$ (at $F_1$).

After the individual blocks 10, 12 and 14 have been formed the blocks are assembled in a sandwich as indicated in FIG. 2, with the faces parallel to the general direction of fiber orientation being in abutting contact.

In the next step of the process indicated at Step B in FIG. 1, the sandwich structure of blocks 10, 12 and 14 is taken through a heating or sintering cycle in an inert atmosphere (such as nitrogen) with pressure being applied in the Z direction. In this heating or sintering cycle, the PTFE material is taken through the melt phase (when the polymer is in the crystalline melt stage). In accordance with the present invention, a long sintering cycle is employed to achieve temperature uniformity when the polymer is in the crystalline melt stage and to permit slow squeeze flow to maintain material conformity during thermal expansion which occurs as the material passes through the crystalline melt point. Preferably, the material will be contained within a frame, mold or other structure during its heat cycle. In the heat cycle, the blocks will be heated to about 380° C. (the melt point of PTFE), will dwell or soak at that temperature, and will then be cooled back to room or ambient temperature. The specific time of the heat cycle, and the stages, temperatures and dwell times for stages of heating and cooling will depend on the details on the window being formed, such as size, shape, construction and total wall thickness.

The combined effects of the heating cycle and applied pressure in the Z direction causes the blocks to join or fuse together to form a unitary structure. This occurs because the polymer (which is initially basically crystalline), when heated above the melt point becomes a rubbery amorphous material; and the polymer chains will, to some extent, diffuse across the joints between adjacent blocks whereby the individual blocks will fuse together to form a unitary structure. The resultant unitary structure will be a single block having a center or core segment (formerly individual block 10) sandwiched between outer or skin segments (formerly blocks 12 and 14). The blocks 10, 12 and 14 will essentially retain their thickness relationships to each other; and the essential effect of this sintering cycle will be to fuse the blocks into a single unitary structure as distinguished from the separate blocks as originally formed.

The resulting unitary block may be machined or otherwise shaped as desired to define the desired electromagnetic window shape.

The final unitary structure will, as with the original component parts, have a construction where each skin section will have a dielectric constant equal to the square root of the dielectric constant of the core section; or, conversely, the dielectric constant of the core section is equal to the square of the dielectric constant of the skin sections. The thickness of the core section is equal to one half of the wavelength for which it is to maximize transmission, and each of the skin (or non-core) sections will have a thickness of one quarter of the wavelength of the frequency for which each skin (or non-core) section is designed to maximize transmission.

An essential feature of the present invention is that the electromagnetic window is a unitary structure consisting entirely of reinforced fluoropolymer materials with outer segments and a core or center segment having thicknesses and dielectric constants tailored to maximize transmission over a desired frequency range. While the general concept of multilayer construction to enhance bandwidth transmission capability is known, it has not heretofore been possible to embody that concept in a unitary composite body of fluoropolymer materials which are normally considered to be intractable. In accordance with the present invention, the several fluoropolymer materials are formed into a unitary composite body whereby distinct interfaces between individual layers are eliminated. This is most important because it eliminates microwave reflection losses that would otherwise occur at the interfaces.

While the foregoing specific discussion has been of a three layer (i.e., core or two outer or skin layers) embodiment, it will be understood that the invention can be embodied in other odd numbered multiple layers or sectioned composite fluoropolymer structures. The following tables 4–12 show computer generated examples of multilayer (3, 5, and 7 layer) unitary electromagnetic PTFE windows in accordance with the present invention. In tables 4–12, the outer air layers are not indicated. Tables 4, 5 and 6 show designs for 3–6 GHz bandwidth transmission for three layer windows of different dielectric constants; tables 7, 8 and 9 show designs for 3–9 GHz bandwidth transmission for 5 layer windows of different dielectric constants; and tables 10, 11 and 12 show designs for 3–12 GHz bandwidth transmission for 7 layer windows of different dielectric constants.

TABLE 4

For Three Layers with Max Transmission in 3 to 6 GHz Range, Core Dielectric Constant = 10

| Layer No. | Diel. Const. | Thick. (mm) | Thickness (λ) | Freq. (GHz) |
|---|---|---|---|---|
| 1 | 3.16228 | 9.37236 | .25 | 4.5 |
| 2 | 10 | 15.8114 | .5 | 3 |
| 3 | 3.16228 | 9.37236 | .25 | 4.5 |

TABLE 5

For Three Layers with Max Transmission in 3 to 6 GHz Range, Core Dielectric Constant = 6

| Layer No. | Diel. Const. | Thick. (mm) | Thickness (λ) | Freq. (GHz) |
|---|---|---|---|---|
| 1 | 2.44949 | 10.6491 | .25 | 4.5 |
| 2 | 6 | 20.4124 | .5 | 3 |
| 3 | 2.44949 | 10.6491 | .25 | 4.5 |

TABLE 6

For Three Layers with Max Transmission in 3 to 6 GHz Range, Core Dielectric Constant = 4

| Layer No. | Diel. Const. | Thick. (mm) | Thickness (λ) | Freq. (GHz) |
|---|---|---|---|---|
| 1 | 2 | 11.7851 | .25 | 4.5 |
| 2 | 4 | 25 | .5 | 3 |
| 3 | 2 | 11.7851 | .25 | 4.5 |

TABLE 7

For Five Layers with Max Transmission in 3 to 9 GHz Range, Core Dielectric Constant = 10

| Layer No. | Diel. Const. | Thick. (mm) | Thickness (λ) | Freq. (GHz) |
|---|---|---|---|---|
| 1 | 2.15444 | 6.81292 | .25 | 7.5 |
| 2 | 4.64159 | 7.73598 | .25 | 4.5 |
| 3 | 10 | 15.8114 | .5 | 3 |
| 4 | 4.64159 | 7.73598 | .25 | 4.5 |
| 5 | 2.15444 | 6.81292 | .25 | 7.5 |

TABLE 8

For Five Layers with Max Transmission in 3 to 9 GHz Range, Core Dielectric Constant = 6

| Layer No. | Diel. Const. | Thick. (mm) | Thickness (λ) | Freq. (GHz) |
|---|---|---|---|---|
| 1 | 1.81712 | 7.41836 | .25 | 7.5 |
| 2 | 3.30193 | 9.17202 | .25 | 4.5 |
| 3 | 6 | 20.4124 | .5 | 3 |
| 4 | 3.30193 | 9.17202 | .25 | 4.5 |
| 5 | 1.81712 | 7.41836 | .25 | 7.5 |

TABLE 9

For Five Layers with Max Transmission in 3 to 9 GHz Range, Core Dielectric Constant = 4

| Layer No. | Diel. Const. | Thick. (mm) | Thickness (λ) | Freq. (GHz) |
|---|---|---|---|---|
| 1 | 1.5874 | 7.93701 | .25 | 7.5 |
| 2 | 2.51984 | 10.4993 | .25 | 4.5 |
| 3 | 4 | 25 | .5 | 3 |
| 4 | 2.51984 | 10.4993 | .25 | 4.5 |
| 5 | 1.5874 | 7.93701 | .25 | 7.5 |

TABLE 10

For Seven Layers with Max Transmission in 3 to 12 GHz Range, Core Dielectric Constant = 10

| Layer No. | Diel. Const. | Thick. (mm) | Thickness (λ) | Freq. (GHz) |
|---|---|---|---|---|
| 1 | 1.77828 | 5.35639 | .25 | 10.5 |
| 2 | 3.16228 | 5.62341 | .25 | 7.5 |
| 3 | 5.62341 | 7.02828 | .25 | 4.5 |
| 4 | 10 | 15.8114 | .5 | 3 |
| 5 | 5.62341 | 7.02828 | .25 | 4.5 |
| 6 | 3.16228 | 5.62341 | .25 | 7.5 |
| 7 | 1.77828 | 5.35639 | .25 | 10.5 |

TABLE 11

For Seven Layers with Max Transmission in 3 to 12 GHz Range, Core Dielectric Constant = 6

| Layer No. | Diel. Const. | Thick. (mm) | Thickness (λ) | Freq. (GHz) |
|---|---|---|---|---|
| 1 | 1.56508 | 5.70957 | .25 | 10.5 |
| 2 | 2.44949 | 6.38943 | .25 | 7.5 |
| 3 | 3.83366 | 8.5122 | .25 | 4.5 |
| 4 | 6 | 20.4124 | .5 | 3 |
| 5 | 3.83366 | 8.5122 | .25 | 4.5 |
| 6 | 2.44949 | 6.38943 | .25 | 7.5 |
| 7 | 1.56508 | 5.70957 | .25 | 10.5 |

TABLE 12

For Seven Layers with Max Transmission in 3 to 12 GHz Range, Core Dielectric Constant = 4

| Layer No. | Diel. Const. | Thick. (mm) | Thickness (λ) | Freq. (GHz) |
|---|---|---|---|---|
| 1 | 1.41421 | 6.0064 | .25 | 10.5 |
| 2 | 2 | 7.07107 | .25 | 7.5 |
| 3 | 2.82843 | 9.91006 | .25 | 4.5 |
| 4 | 4 | 25 | .5 | 3 |
| 5 | 2.82843 | 9.91006 | .25 | 4.5 |
| 6 | 2 | 7.07107 | .25 | 7.5 |
| 7 | 1.41421 | 6.0064 | .25 | 10.5 |

Electromagnetic windows made in accordance with the present invention will have broad band frequency transmission capability (on the order of in the range of from 3 to 12 $GH_2$ or higher, depending on the number and thickness of layers). In addition, particularly because of the fiber orientation, the windows will resist rain erosion, and will have desirable ablative properties for incorporation in missiles and other radome applications. The windows will also have good thermal shock resistance characteristics, good physical shock resistance characteristics and will be characterized by low bore-sight error slope and dielectric stability with temperature.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electromagnetic window for transmission in a frequency range having:

a core section of fluoropolymer material having a first dielectric constant;

a second section of fluoropolymer material and a third section of fluoropolymer material;

said core section being sandwiched between said second and third section;

said second and third section each having a dielectric constant approximately equal to the square root of the dielectric constant of said core section; and said core and second and third sections of fluoropolymer material being a unitary structure with sections of different dielectric constants formed by fusing said sections together under heat and pressure.

2. An electromagnetic window as in claim 1 wherein:

the thickness of said core section is approximately equal to ½ the wavelength of the frequency for which it is to maximize transmission; and the thickness of each of said second and third sections is approximately equal to ¼ the wavelength of the frequency for which they are to maximize transmission.

3. An electromagnetic window as in claim 1 wherein:

said sections are fused together at a temperature above the crystalline melt point; and said pressure is applied perpendicular to the direction of interface between said core section and said second and third layers.

4. An electromagnetic window as in claim 1 wherein:

said core section is a first polytetrafluoroethylene material; and said second and third sections are a second polytetrafluoroethylene material.

5. An electromagnetic window as is claim 1 wherein:

said core sections and said second and third sections are fiber reinforced.

6. An electromagnetic window as in claim 1 wherein: the dielectric constant of said core is within ±15% of the square of the dielectric constant of said first and third sections.

7. An electromagnetic window for broad bandwidth signal transmission, including:

a core section of fluoropolymer material having a first dielectric constant;

a plurality of pairs of sections of fluoropolymer material;

a first of said pairs of fluoropolymer material being on opposite sides of said core section and sandwiching said core section therebetween;

each of the remaining pairs of fluoropolymer material sandwiching therebetween said core section and all other pairs of fluorocarbon material closer to said core;

the fluoropolymer material of section of said pairs of material having a dielectric constant approximately equal to the square root of the product of the dielectric constants of the materials on each immediate side thereof; and said core and pairs of sections of fluoropolymer material being a unitary structure formed by fusing said sections together under heat and pressure.

8. An electromagnetic window as in claim 7 wherein:

the thickness of said core section is approximately equal to ½ the wavelength of the frequency for which it is to maximize transmission; and the thickness of each of said pairs of sections is approximately equal to ¼ the wavelength of the frequency for which they are to maximize transmission.

9. An electromagnetic window as in claim 7 wherein:

said sections are fused together at a temperature above the crystalline melt point; and said pressure is applied perpendicular to the direction of interface between said core section and said second and third layers.

10. An electromagnetic window as in claim 7 wherein:

said core section is a first polytetrafluoroethylene material; and said pairs of sections are polytetrafluoroethylene material, different from said core.

11. An electromagnetic window as is claim 7 wherein:

said core sections and said second and third sections are fiber reinforced.

12. An electromagnetic window as in claim 7 wherein:

the dielectric constant of each of said sections from said core outwardly is within ±15% of the square root of the product of the dielectric constants of the materials on each immediate side thereof.

13. The method of forming an electromagnetic window for transmission in a frequency range, including the steps of:

forming a first core section of fluoropolymer material having a first dielectric constant;

forming second and third sections of fluoropolymer material having a dielectric constant approximately equal to the square root of the dielectric constant of said core section;

assembling said sections in an array with said core section sandwiched between said second and third sections; and treating said array under heat and pressure to fuse said sections into a unitary structure having sections of different dielectric constants.

14. The method of forming an electromagentic window as in claim 13 wherein:

the thickness of said core section is approximately equal to ½ the wavelength of the frequency for which it is to maximize transmission; and thickness of each of said second and third sections is approximately equal to ¼ the wavelength of the frequency for which they are to maximize transmission.

15. The method of forming an electromagnetic window as in claim 13 wherein:

said sections are fused together at a temperature above the crystalline melt point; and said pressure is applied perpendicular to the direction of interface between said core section and said second and third layers.

16. The method of forming an electromagnetic window as in claim 13 wherein:

said core section is a first polytetrafluoroethylene material; and said second and third sections are a second polytetrafluoroethylene material.

17. The method of forming an electromagnetic window as in claim 13 wherein:

said core sections and said second and third sections are fiber reinforced.

18. The method of forming an electromagentic window as in claim 13 wherein:

the dielectric constant of said core is within ±15% of the square of the dielectric constant of said first and third sections.

19. The method of forming an electromagnetic window for transmission in a frequency range, including the steps of:

forming a first core section of fluoropolymer material having a first dielectric constant;

forming pairs of sections of fluorocarbon material of different dielectric constant than said core;

assembling said sections in an array with said pairs of material being arranged one each on opposite sides of said core with each section of each pair being equally spaced from said core;

the dielectric constant of each section of material being approximately equal to the square root of the product of the dielectric constant of the material on each immediate side thereof; and treating said sections under heat and pressure to fuse said sections into a unitary structure having sections of different dielectric constants.

20. The method of forming an electromagnetic window as in claim 19 wherein:

the thickness of said core section is approximately equal to ½ the wavelength of the frequency for which it is to maximize transmission; and the thickness of each of said pairs of sections is approximately equal to ¼ the wavelength of the frequency for which they are to maximize transmission.

21. The method of forming an electromagnetic window as in claim 19 wherein:

said sections are fused together at a temperature above the crystalline melt point; and said pressure is applied perpendicular to the direction of interface between said core section and said second and third layers.

22. The method of forming an electromagnetic window as in claim 19 wherein:

said core section is a first polytetrafluoroethylene material; and said pairs of sections are polytetrafluoroethylene material, different from said core.

23. The method of forming an electromagnetic window as is claim 19 wherein:

said core sections and said second and third sections are fiber reinforced.

* * * * *